United States Patent [19]

Kemp

[11] Patent Number: 5,599,462
[45] Date of Patent: Feb. 4, 1997

[54] RESTRAINING DEVICE FOR FILTER CLOTH

[75] Inventor: Geoffrey D. Kemp, Mississauga, Canada

[73] Assignee: Komline-Sanderson Limited, Ontario, Canada

[21] Appl. No.: 461,680

[22] Filed: Jun. 5, 1995

[51] Int. Cl.⁶ .......................... B01D 33/04; B01D 33/056
[52] U.S. Cl. .......................... 210/783; 210/791; 210/386; 210/400; 210/401
[58] Field of Search .................................. 210/386, 387, 210/391, 400, 401, 783, 791

[56] References Cited

U.S. PATENT DOCUMENTS

| | | | |
|---|---|---|---|
| 3,443,695 | 5/1969 | O'Neill | 210/387 |
| 3,497,063 | 2/1970 | Hirs | 210/400 |
| 3,870,641 | 3/1975 | Pierson | 210/400 |
| 3,899,426 | 8/1975 | Hirs | 210/387 |
| 4,008,158 | 2/1977 | Davis | 210/400 |
| 4,377,479 | 3/1983 | Pierson | 210/400 |
| 4,377,480 | 3/1983 | Pierson | 210/400 |
| 4,430,231 | 2/1984 | Bratten | 210/386 |
| 4,446,023 | 5/1984 | Pierson | 210/400 |
| 4,472,279 | 9/1984 | Pierson | 210/400 |
| 4,495,070 | 1/1985 | Pierson | 210/400 |
| 4,568,460 | 2/1986 | Bratten | 210/387 |
| 4,857,194 | 8/1989 | Pierson | 210/400 |
| 5,499,455 | 9/1995 | Womack | 210/387 |

FOREIGN PATENT DOCUMENTS 58-11016  4/1983  Japan .

OTHER PUBLICATIONS

Komline-Sanderson Ltd., The Komline-Sanderson horizontal vacuum filter precise, continuous liquid/solid separation, cake washing & drying, 1992.

*Primary Examiner*—Christopher Upton
*Attorney, Agent, or Firm*—Gifford, Krass, Groh, Sprinkle, Patmore, Anderson & Citkowski, P.C.

[57] ABSTRACT

A vacuum or gas pressure clamp prevents movement of an elongate filter cloth used in a horizontal vacuum filter. The clamp includes a support frame and a planar supporting device having a perforated support surface for supporting the filter cloth. The vacuum clamp is mounted on the frame and is adapted for connection to a vacuum source so that vacuum can be applied to numerous holes in the support surface. An imperforate sealing sheet extends over the support surface and in close proximity thereto. The filter cloth can be drawn between the supporting device and the sealing sheet. A vacuum can be applied to the filter cloth in order to prevent its movement in the longitudinal direction. Preferably the support surface forms a rectangular grid comprising rows of closely spaced holes. This grid is surrounded by a sealing surface. In the gas pressure clamp, an enclosure extends around the supporting device and the sealing sheet and a positive air pressure can be provided in this enclosure. In this version, the perforated support surface can be vented to atmosphere.

32 Claims, 4 Drawing Sheets

RESTRAINING DEVICE FOR FILTER CLOTH

BACKGROUND OF THE INVENTION

This invention relates to restraining devices for preventing movement of a filter cloth, also to filtering machines that employ a movable filter cloth and a restraining device for this cloth, and to a method of filtering a material using a horizontal vacuum filter.

Horizontal vacuum filtering machines employing a movable belt filter have come into wide spread use for precise, continuous liquid/solid separation, cake washing and drying. A horizontal belt filter is described in U.S. Pat. No. 3,870,641 which issued Mar. 11, 1975 to H. G. Pierson. This machine employs an endless belt of filter cloth, this belt having an upper reach that extends over a series of vacuum trays. Each tray is connected by vacuum pipes to a vacuum pump. At the end of the upper reach, the belt passes over a movable, terminal discharge roller which can be moved by rams to an extended position. On the return reach of the belt, it passes through a belt washer wherein jets of water remove traces of any filter cake. The belt then passes over a drive roller and a drive contact roller, each of which is provided with a ratchet so that they can rotate only in the forward direction. It is important to prevent the lower reach of the filter belt from being pulled back by the outward movement of the discharge roller.

In the current versions of the above filtering machine, the vacuum is removed from the vacuum trays before the discharge roller is moved. The discharge roller acts now as the drive roller and its movement to the extended position causes the filter cloth to advance over the series of vacuum trays, one tray at a time. Vacuum is applied to the vacuum trays again before the discharge roller is caused to retract.

Although the method of restraining backward movement of the filter cloth described in the above-mentioned U.S. patent is generally satisfactory, it can fail under some filtration conditions that leave the filter cloth surface soiled. If the filter cloth is still soiled when it is passing over the drive roller, the cloth can slip causing the filter to operate in an unpredictable manner and possibly preventing operation of the filtering machine.

Although modifications have been attempted to the aforementioned driver roller and drive contact roller in these horizontal vacuum filters, these modifications have not been very successful. One such previous modification involved trapping the filter cloth between a fixed member and a movable member which applied pressure generated by an air actuated cylinder or similar device. This known clamp roll can cause damage to the filter fabric because it applies a relatively high point force to the filter cloth.

It is an object of the present invention to provide a relatively simple, inexpensive means for preventing movement of a filter cloth in a vacuum filtering machine when this is required.

It is a further object of this invention to provide a vacuum clamp capable of preventing movement of an elongate filter cloth, which clamp has a perforated support surface for supporting the filter cloth and a sealing sheet that extends over this support surface.

SUMMARY OF THE INVENTION

According to one aspect of the invention, a vacuum clamp for preventing movement of an elongate, movable filter cloth comprises a support frame and a supporting device having a perforated support surface for supporting the filter cloth. The supporting device is mounted on the support frame and is adapted for connection to a vacuum source so that vacuum can be applied to numerous holes in the support surface. An imperforate sealing sheet extends over the support surface and is in close proximity thereto. A number of weights are arranged on the sealing sheet. The elongate filter cloth can be drawn between the supporting device and the sealing sheet and a vacuum can be applied to the filter cloth by the supporting device in order to prevent movement of the filter cloth in its longitudinal direction. The sealing sheet is pulled against the filter cloth by the vacuum and thereby prevents air from passing through the filter cloth in the area of the perforated support surface.

Preferably the support surface forms a planar rectangular grid comprising rows of closely spaced holes and this grid is surrounded by a sealing surface positioned below the sealing sheet.

According to a further aspect of the invention, a filtering machine comprises an endless belt of filter cloth arranged to have a horizontally extending, upper reach and a lower reach and at least one vacuum tray disposed beneath the upper reach. There are also means for feeding material to be filtered onto the upper reach and means for intermittently advancing the upper reach of the belt by a predetermined distance in a selected direction. This machine includes a vacuum clamp for preventing lengthwise movement of at least a section of the lower reach of the belt by clamping a portion of the lower reach. The clamp operates when the advancing mechanism is used to advance the upper reach. The clamp includes a perforated, planar support surface for holding the filter cloth during operation of the clamp. The clamp has air passage means for applying vacuum to numerous holes in the support surface and an imperforate sealing sheet extending over the support surface and in close proximity thereto. Means for connecting a vacuum source to the clamp and means for supporting the vacuum clamp in a position adjacent to the lower reach of the filter cloth the lower reach are provided. The belt extends between the support surface and the sealing sheet. A vacuum can be applied to the filter cloth by the clamp, thereby pulling the sealing sheet against the filter cloth.

In a preferred version of the machine there is a cloth wash box for washing the filter cloth running along a lower reach of the belt. The vacuum clamp is mounted near this wash box so that the cloth moves from the wash box to the vacuum clamp.

According to another aspect of the invention, a gas-pressure operated clamp for preventing movement of an elongate movable filter cloth comprises a supporting device for supporting an area of a filter cloth, this device having a supporting surface arranged to extend along one side of the filter cloth. An imperforate pressure sheet extends over the supporting surface and in proximity thereto. A number of weights are mounted on top of the pressure sheet. The clamp includes means for applying gas pressure to one side of the sheet so as to press the sheet towards a supporting surface over the area of the filter cloth. During use of the clamp, the elongate filter cloth is drawn between the other side of the pressure sheet and the supporting device and gas pressure is applied to the sheet to clamp the filter cloth between the pressure sheet and the supporting surface, thereby preventing movement of the filter cloth in its longitudinal direction.

According to still another aspect of the invention, a cleaning device for an elongate, movable filter cloth comprises a support frame, a supporting device having a support surface with numerous perforations formed therein, said supporting device being mounted on said support frame and being adapted for connection of said perforations to a vacuum source or atmosphere, an imperforate sealing cover extending over said support surface and in close proximity thereto, means for introducing and distributing a cleaning liquid between said cover and said filter cloth when the latter is drawn between said cover and said supporting device, and means for forcing said cleaning liquid through the filter cloth and into said supporting device, wherein at least a peripheral region of said cover is caused by said forcing means to be pressed against an adjacent surface of the filter cloth, thereby sealing the peripheral region of the cover against the filter cloth.

According to still another aspect of the invention, a method for filtering a material using a horizontal vacuum filter comprises providing a filtering machine having an endless belt of filter cloth with a horizontal upper reach and a lower reach and at least one vacuum tray disposed beneath said upper reach; feeding material to be filtered onto said upper reach and applying a vacuum to said material by means of said at least one vacuum tray in order to filter same; intermittently advancing said upper reach of the belt in a forward lengthwise direction by a predetermined distance; and preventing said lower reach of the belt from moving in said forward lengthwise direction during the advancing step by clamping a portion of said lower reach with a clamping mechanism after filtered material has been discharged from said portion of the filter cloth, said clamping mechanism comprising a supporting device for supporting said filter cloth and an imperforate sealing sheet extending over said supporting device and in close proximity thereto, said belt extending between said supporting device and said sealing sheet, said clamping step being carried out by applying a vacuum to said filter cloth by said supporting device, said sealing sheet being pulled against said filter cloth by the vacuum.

Further features and advantages will become apparent from the following detailed description taken in conjunction with the drawings.

DETAILED DESCRIPTION OF THE DRAWINGS

DETAILED DESCRIPTION OF PREFERRED EMBODIMENTS

Figure 1:
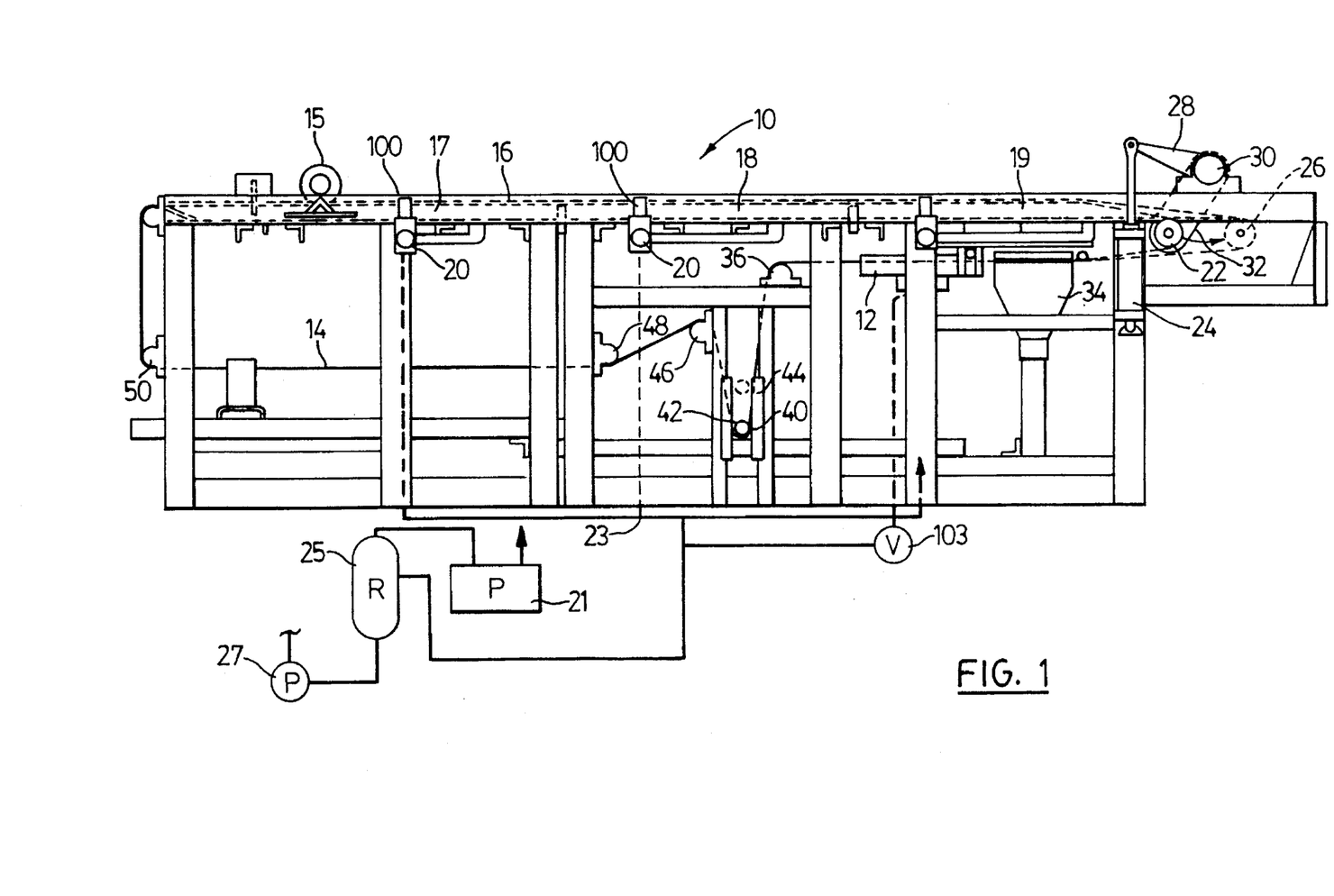
FIG. 1 is a side elevation of a horizontal vacuum filtering machine constructed in accordance with the invention with some of the lines and components connected thereto being shown schematically for ease of illustration.

The horizontal vacuum filtering machine 10 of FIG. 1 is of standard, known configuration except for the use of a vacuum clamp 12 constructed in accordance with the invention and the associated vacuum supplying devices. The vacuum clamp 12 takes the place of a non-return roller that is provided with a ratchet so that it can rotate in only the forward direction of a filter belt 14. The belt 14 is an endless, elongate belt of filter cloth. An upper reach 16 of this belt extends horizontally over a series of vacuum trays at 17, 18 and 19. Each tray is connected by vacuum pipes 20 to a vacuum pump 21 or pumps. Preferably the individual pipes 20 are connected to main vacuum supply pipe 23 which itself is connected to a filtrate receiving tank 25. It is this tank which is connected to the vacuum pump 21 and also a filtrate pump 27 for removing collected filtrate from the tank.

At the discharge end of the upper reach 16, the belt passes over a movable terminal discharge roller 22 which can be moved by rams 24 to an extended position indicated at 26 in broken lines. The upper end of the ram arm is connected to a connecting arm 28 which is able to pivot at pin or shaft 30. Pivotable movement of the arm 28 causes a corresponding pivotable movement of supporting arm 32 on which one end of the roller 22 is mounted. It is the roller 22 which also functions as a drive roller to advance the filter cloth.

After passing over the roller 22, the lower reach of the belt passes through a cloth wash box 34 wherein jets of water can be arranged to play on the belt to remove any filter cake that remains after discharge. The aforementioned vacuum clamp 12 is mounted in the vicinity of the wash box 34 and is preferably mounted as close to the wash box as possible in order that it will catch any dripping from the belt before this occurs. As shown in FIG. 1, the filter cloth moves from the wash box to the vacuum clamp, the construction of which is described hereinafter. The belt next passes over a fixed roller 36. The clean filter cloth is accumulated and tensioned by a movable, horizontally extending roller 40 which is free to move up and down along vertical guide members 42 and 44. The belt then passes over fixed guide rollers 46, 48 and 50 before passing again along the upper reach 16 of the machine.

In the operation of the machine of FIG. 1, a slurry to be filtered is fed onto the belt 14 through a continuous feeding device 15 and the slurry is evenly distributed over a predetermined area which extends across the width of the belt. The device 15, which is known, constitutes means for feeding the material to be filtered. In order to advance the belt, the rams 24 are operated and they cause the roller 22 to be pushed out to the position at 26. As the operation of the vacuum clamp 12 (in a manner described below) prevents pulling back of the belt 14, the movement of the roller 22 pulls the belt to the right in FIG. 1 along the upper reach. The slurry placed on the belt by the chute is pulled along until it lies over the first vacuum tray 17. When this movement is completed, the vacuum trays are switched on, that is, their suction becomes active, and removal of liquid from the slurry commences. Vacuum is released from the vacuum clamp 12 allowing the filter cloth 14 to be tensioned by tension roller 40. Fluid pressure is then reversed in the rams 24 causing the roller 22 to retract. Tension on the filter cloth is maintained by tension roller 40 which accumulates the cleaned filter cloth. The slack increases at the roller 40 so that the latter is able to return to its lowermost position.

As this cycle is carried out, the feed slurry is continuously delivered to the belt by the device 15. It is delivered to a pool or non-vacuum section on the upper reach of the belt. The vacuum trays are switched "off" at each pulling forward stage and "on" during each retensioning stage.

Further description of the filtering machine herein is believed unnecessary because, except for the vacuum clamp described hereinafter, such machines are known in the art and are available from such companies as Komline-Sanderson Limited of Brampton, Ontario, Canada.

Figure 2:
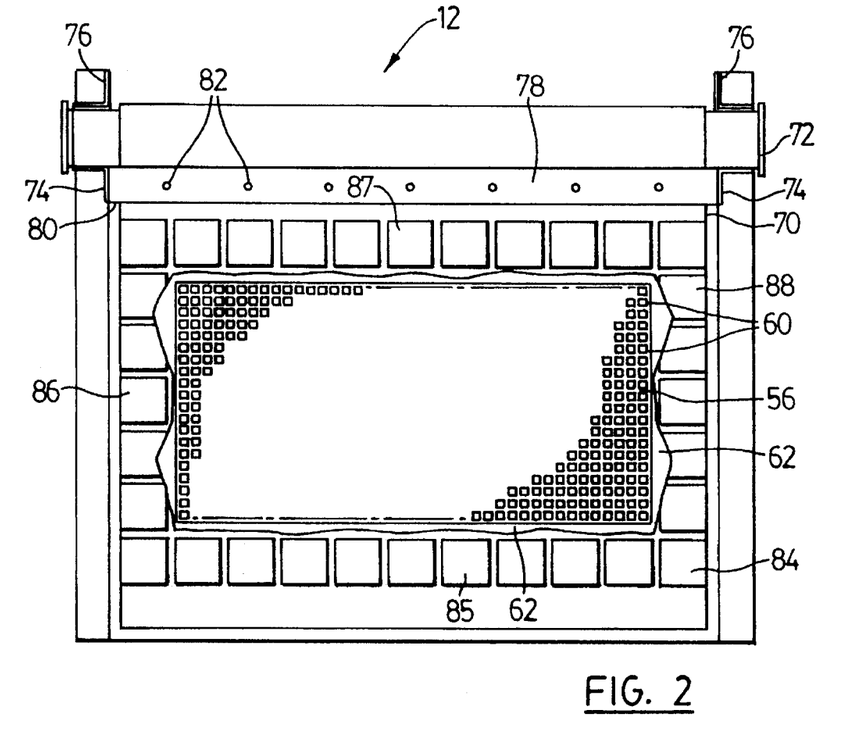
FIG. 2 is a plan view of a vacuum clamp employed in the filtering machine of FIG. 1.
Figure 3:
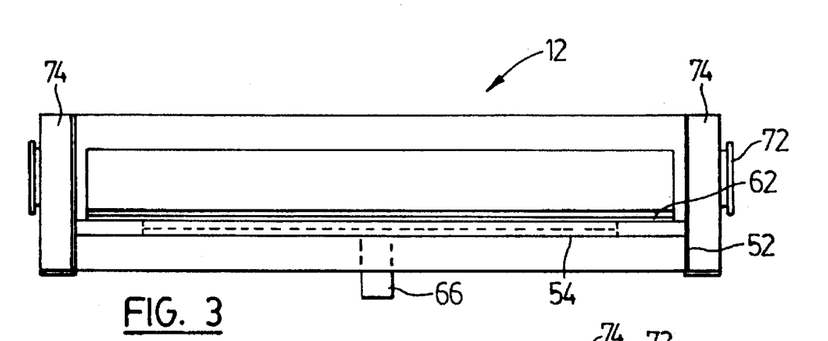
FIG. 3 is a rear end view of the vacuum clamp of FIG. 2.
Figure 4:
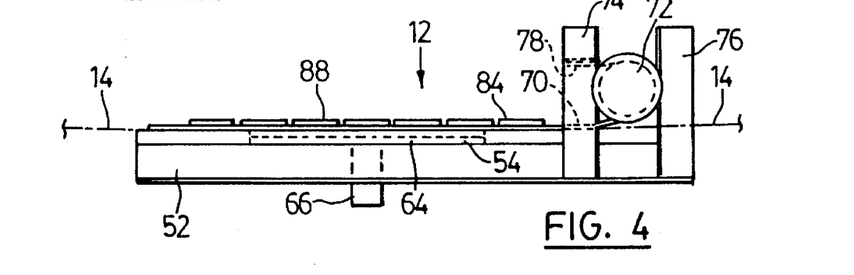
FIG. 4 is a side elevation of the vacuum clamp of FIG. 2.

Turning now to FIGS. 2 to 4 of the drawings wherein the construction of the vacuum clamp 12 is illustrated, the clamp includes a support frame 52 and a planar supporting device 54 having a perforated support surface 56 for supporting the filter cloth of the belt 14. The supporting device is mounted on the support frame and is adapted for connection to a vacuum source so that a vacuum can be applied to numerous holes 60 in the support surface. Preferably the support surface forms a rectangular grid comprising rows of closely spaced holes 60. This grid is surrounded by a sealing surface 62. Preferably the sealing surface extends along all four sides of the rectangular grid and this surface should be sufficiently wide to ensure an adequate seal is created. The rectangular drainage grid 54 is preferably made of low-friction polypropylene. This grid itself can be made in a similar fashion to the known vacuum trays 17 to 19 used to carry out the filtering operation in the machine 10. The grid can be made from a drilled or otherwise perforated plate. It can also be made by injection moulding process. A bottom section 64 of the device 54 is open and communicates with all of the holes 60 formed in an upper section of the device. Thus, the bottom section 64 acts as a vacuum plenum for the device. This plenum can be connected via downwardly extending pipe 66 to a vacuum source which preferably is the same vacuum source that is connected to vacuum trays 17 to 19.

The clamp includes an imperforate sealing sheet 70 that extends over the support surface 56 and is in close proximity thereto. The sheet 70 should be supple to allow the vacuum (or possibly pressure forces—see below) to form a secure seal between the underside of the sheet and the sealing surface 62. One suitable material for the sheet 70 is Neoprene. In order to hold this sealing sheet in place, a support bar 72 extends across the path of the belt 14 and is supported above the level of the device 54 by means of upright frame members 74 and 76. These frame members can be supported at the bottom by the above-mentioned support frame 52. The bar 72 preferably has a circular cross-section so that the forward end of the sealing sheet 70 can be wrapped around the bar as indicated in FIG. 4. An end section 78 of the sealing sheet is secured to a transversely extending frame member 80 by a number of bolts 82.

In order to provide better sealing, it is preferred that a number of weights 84 be provided at the edges or periphery of the sealing sheet. These weights are positioned on top of the sealing sheet and are secured thereto. The weights are located above the sealing surface 62 and preferably comprise a number of flat tile-like members arranged in four rows 85 to 88 around the perimeter of the grid of holes 60. Although the use of the weights is optional, these weights help ensure close contact between the sealing sheet, the filter cloth and the sealing surface 62. By using small dense tile-like weights, this allows the sealing sheet to close tightly even when the bulky seal section of the belt 14 is passing through the vacuum clamp. A heavy metal, such as stainless steel, can be used to make the weights 84.

It will be understood that the belt 14 of filter cloth as indicated in FIG. 4 is drawn between the supporting device 54 and the sealing sheet 70. Then, when one wishes to prevent backward movement of the belt, vacuum can be applied to the filter cloth in the area of the perforated support surface 56 in order to prevent movement of the cloth. When this vacuum is applied, the sealing sheet is pulled against the filter cloth by the vacuum and thereby prevents air from passing through the filter cloth in the area of the perforated support surface. The filter cloth has a width corresponding substantially to or slightly greater than the dimension of the rectangular grid 56 which is perpendicular to the direction of movement of the filter cloth.

A three-way valve 100, of which there can be several on the machine, is mounted on the side of the machine near the upper reach of the belt 14 as shown in FIG. 1. The valve can be constructed in the manner illustrated and described in U.S. Pat. No. 4,857,194 which issued Aug. 15, 1989 to H. G. Pierson, the disclosure of which is incorporated herein by reference. Other known actuated three-way valves can also be used for this purpose of controlling the application of vacuum to the vacuum trays. The three-way valves 100 are connected to downwardly extending pipes of the vacuum trays. The valves alternately connect the plenums of these vacuum trays to the vacuum source, for example, vacuum pump 21 or to atmosphere.

It will be understood that a similar three-way valve 103 can be connected to the vacuum clamp 12 in order to operate same. In such case, one arm or connection of the valve is connected to the pipe 66 of the vacuum clamp and another arm or connection is connected to the vacuum source. A suitable commercial valve to operate the clamp 12 is a Durco 3 way plug valve with actuator, available from The Duriron Company Inc. For small applications, an Asco 3 way solenoid valve can be used. By a simple control arrangement, one can operate the valves for the vacuum trays 17, 18, 19 in an alternating fashion with the valve for the vacuum clamp. With such an arrangement, it is possible to use the same vacuum source for both the operation of the vacuum trays of the filtering machine and the operation of the vacuum clamp as illustrated in FIG. 1. When the valves for the vacuum trays are in one position causing the vacuum trays to be vented, the valve 103 for the vacuum clamp is in the opposite position causing the vacuum clamp to operate and hold the filter cloth firmly against movement. Similarly, when the valves 100 for the vacuum trays are in another position causing vacuum to be supplied to the trays, the valve 103 for the clamp is in a different position so that its supporting device 54 is vented.

An optional, added feature of the vacuum clamp is the possible inclusion of means for introducing water to the side of the filter cloth facing the sealing sheet 70. This added water is then drawn through the filter cloth during operation of the vacuum clamp in order to remove solids that may be still entrained in the filter cloth. Not only water, but other suitable cleaning liquids, can be introduced in this manner. Back flushing the filter cloth in this way can provide very effective cleaning of the cloth which cannot be achieved by spraying onto the filter cake side of the cloth. This back flushing technique may be utilized in the filtering machine 10 independently of the need to clamp the filter cloth, if desired.

Figure 5:
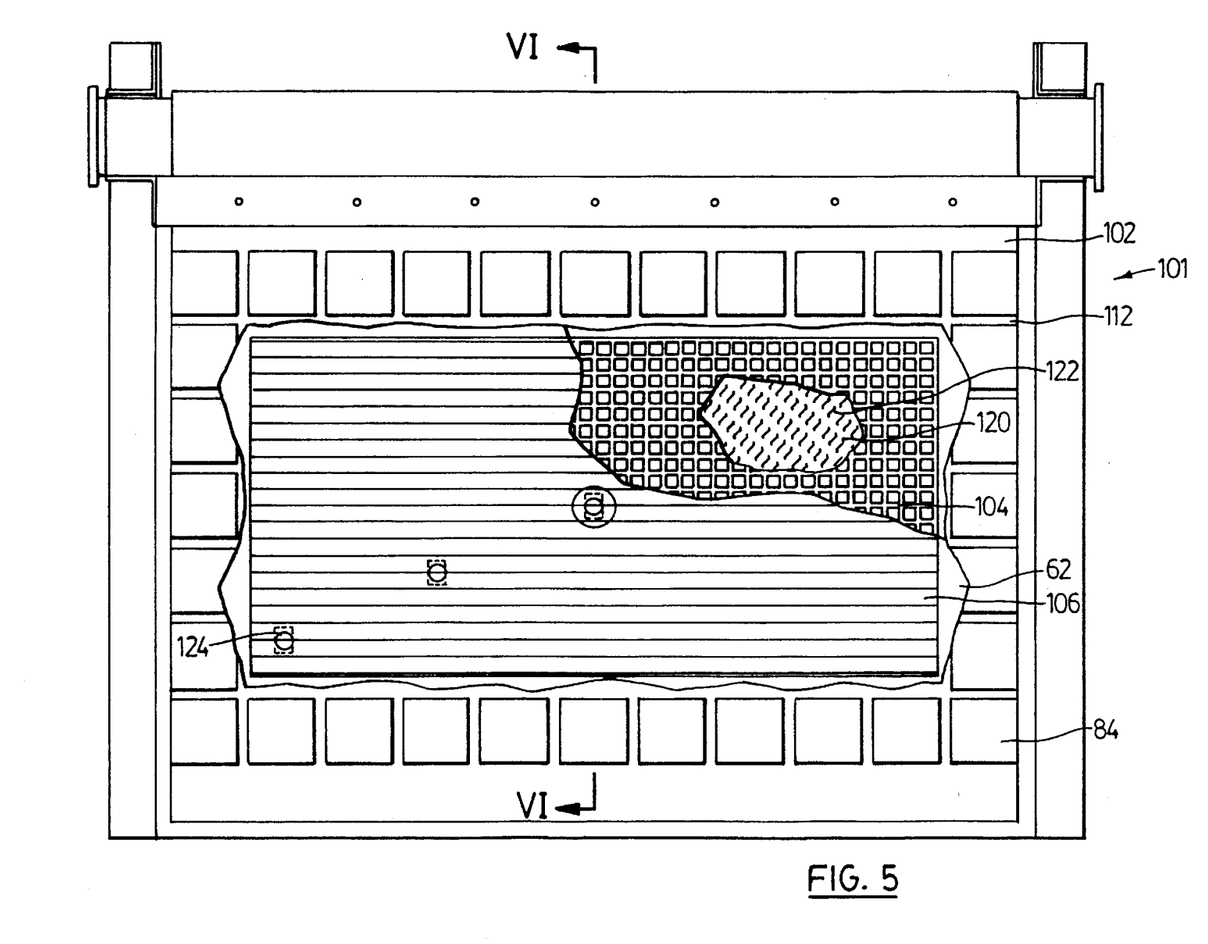
FIG. 5 is a plan view of a further embodiment of a vacuum clamp with means for introducing a cleaning liquid to a side of the filter cloth facing the sealing sheet.
Figure 6:
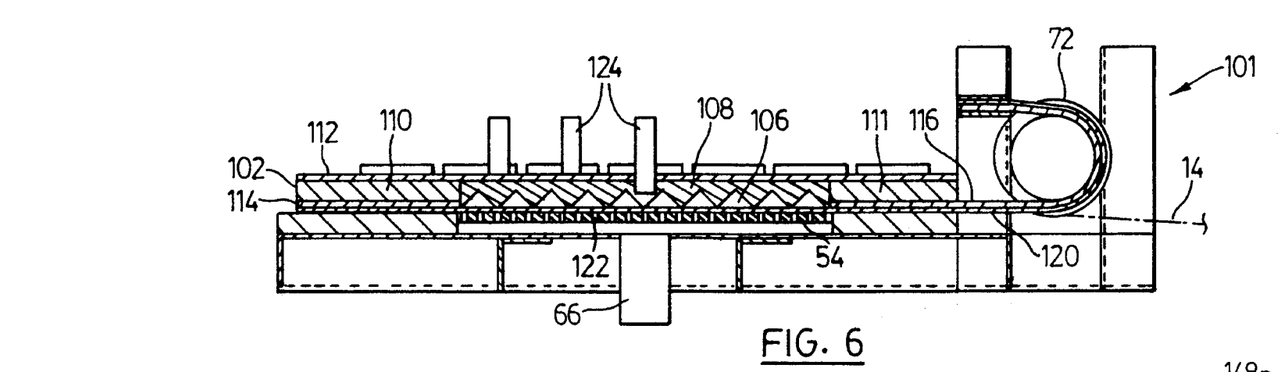
FIG. 6 is a cross-sectional elevation taken along the line VI–VI of FIG. 5.

Shown in FIGS. 5 and 6 is another embodiment of a vacuum clamp 101 for an elongate, movable filter cloth. Except as described hereinafter, the vacuum clamp 101 is constructed in a similar fashion to the vacuum clamp 12 shown in FIGS. 2 to 4 of the drawings. The vacuum clamp 101 is equipped with means for introducing a cleaning fluid, such as water, to a side of the filter cloth 14 facing an imperforate sealing cover or sealing sheet 102. The cleaning liquid or water is drawn through the filter cloth during operation of the clamp 101 in order to remove solids entrained in the filter cloth. The sealing cover 102 extends over the support surface 104 and in close proximity thereto. There are means for introducing and distributing the cleaning liquid or water between the cover 102 and the filter cloth when the latter is drawn between the cover and the supporting surface 104. The preferred means includes a number of side-by-side distribution channels 106. As shown in FIG. 6, these channels have an inverted V shape in cross-section and they are closed at each end so that water in the channels tends to be forced through the filter cloth by the cover. As illustrated in FIG. 5, the channels cover a rectangular area that is substantially the same in its dimensions as and located directly over the rectangular grid that forms the perforated support surface 104. The channels are cut or otherwise formed in a relatively thick, flexible central pad 108 which is waterproof. Extending along side edges of this central pad are flexible, sealing side pads 110 and 111. Extending across the top of the central and side pads and helping to connect these pads together is a rectangular, flexible top sheet 112 which can be made of a suitable plastics or rubber material. The side pads 110 and 112 can be covered with bottom sheets or pads 114 and 116 with the bottom sheet 116 extending around the support bar 72. In order to provide for a better and more even distribution of the water over the adjacent surface of the filter cloth, there is preferably provided a thin distribution membrane 120 which extends across the bottom of all of the channels and across the bottom of sheets or pads 114 and 116. The membrane 120 is covered with rows of small slits or slots 122 which permit the even flow of the cleaning fluid through the membrane from the channels. The membrane is bonded or otherwise firmly secured to the bottom sheets 114 and 116.

In order to deliver water or cleaning fluid to the channels, there can be provided a series of metal or plastic pipe connectors 124. These pipe connectors extend through the top sheet 112 and through the central pad 108 so that they each open into two or more adjacent channels 106 in the manner illustrated in FIG. 6. The pipe connectors can be distributed diagonally across the sealing cover in the manner illustrated in FIG. 5, if desired. It will also be understood that the relatively short, rigid pipe connectors 124 will normally be connected to flexible rubber or plastic hose to a source of water or other cleaning fluid (not shown) which is fed under a suitable pressure. It will be understood that the flow of water or cleaning fluid will be shut off when the clamp is not operating and the vacuum source is not connected to the clamp. The flow of water is resumed by a suitable control device when the clamp is used to stop movement of the filter cloth.

There are means for forcing the cleaning liquid through the filter cloth of the belt 14 and into the supporting device or grid. If the vacuum clamp 101 is in fact acting as a clamp and vacuum is being applied to the downwardly extending pipe 66, then the vacuum will act as said forcing means, in effect pulling the cleaning liquid from the channels 106, through the membrane 120 and through the filter cloth. The rows of weights 84 about the perimeter of the cover will also act to press the cover down against the sealing surface 62 and this action will also tend to force the water or cleaning liquid through the filter cloth.

It should also be understood that the device 101 of FIGS. 5 and 6 can also be used simply as a cleaning device for a filter cloth and it need not be employed as a vacuum clamp. In this case, the vacuum force, if any, applied by the supporting device 54 will be substantially less so that it does not prevent further forward movement of the belt 14. The device 101 then simply acts to apply a cleaning liquid or water to the upper surface of the belt where either the pressure of the water or a mild vacuum pushes or pulls the cleaning liquid through the filter cloth. After passage through the cloth, the liquid drains out through the pipe 66.

Instead of using a vacuum clamp in order to effectively prevent movement of the filter cloth, it is also possible to use positive air or gas pressure, particularly in a filtering machine that uses positive pressure to carry out the filtering operation. These known filtering machines are sealed in their upper section through which the belt extends so that a positive pressure can be built up above the filter cloth. This positive pressure is then used to push the filtrate through the material being processed.

Figure 7:
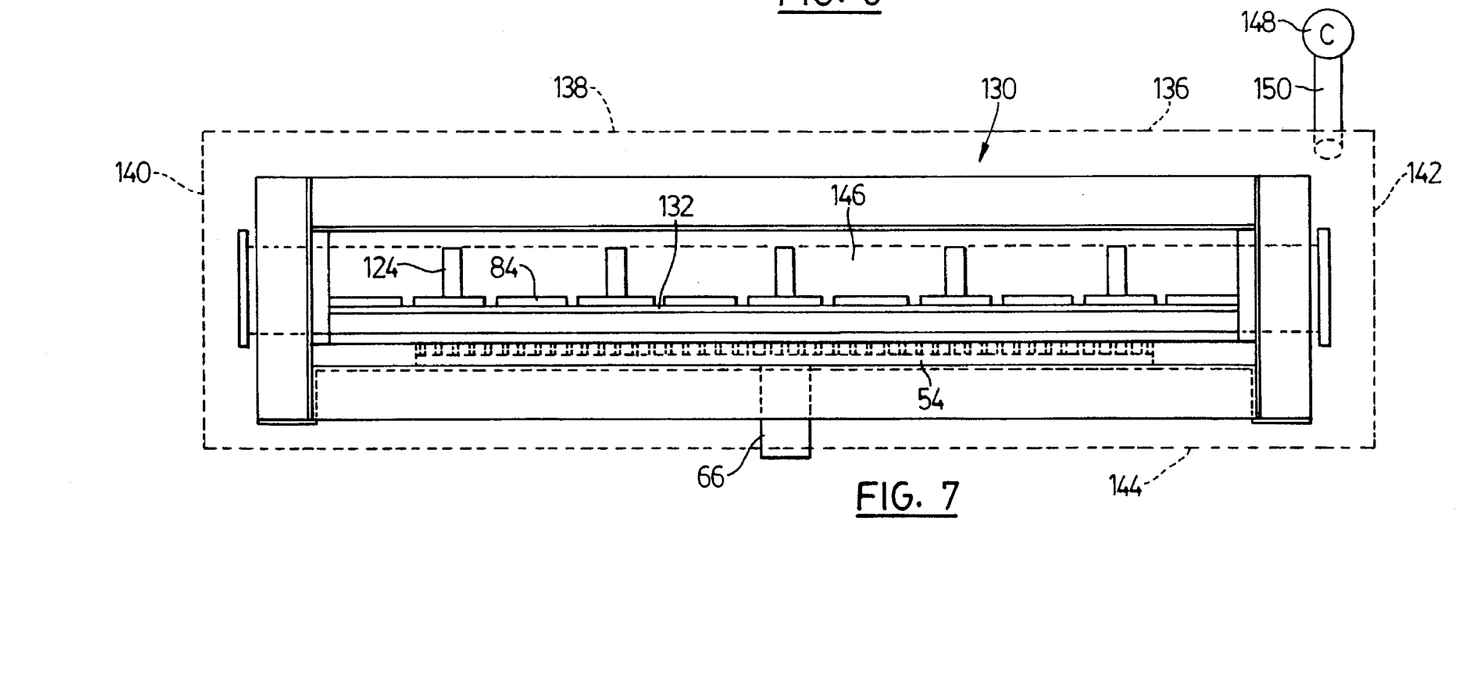
FIG. 7 is a rear end view of a clamp for a filter cloth employing positive air pressure above the sealing sheet.

A gas pressure operated clamp for an elongate, movable filter cloth is illustrated in FIG. 7. Except as specifically described hereinafter, this clamp 130 constructed in the same manner as the vacuum clamp 12 described above. This clamp also includes a planar supporting device 54 which preferably forms a rectangular grid having numerous perforations arranged in rows. This device supports an area of the filter cloth on its perforated support surface arranged to extend along one side of the filter cloth. An imperforate pressure sheet 132 extends over the supporting surface and in proximity thereto. There are means for applying gas pressure to one side of the sheet 132 so as to press the sheet towards the supporting surface over said area of the filter cloth. This gas pressure applying means can include a separate enclosure 136 indicated in dotted lines in FIG. 7. This sealed enclosure extends around the supporting device 54 and the pressure sheet 132 and it can include a top 138, sidewalls 140 and 142 and a bottom wall 144. The top extends over the pressure sheet and is spaced therefrom to provide an air space 146 between the top and the pressure sheet 132. There can be means for maintaining a positive air pressure, that is one exceeding atmospheric pressure in the enclosure 136. This maintaining means can comprise an air compressor 148 connected to the enclosure by means of suitable piping 150. If the enclosure 130 is maintained under sufficient positive air pressure when a clamping force is to be applied to the filter cloth, the holes in the rectangular grid at 54 can simply be vented to atmosphere through the pipe 66. It will be understood that during use of the clamp 130, the elongate filter cloth is drawn between the pressure sheet 132 and the supporting device 54 and the positive gas pressure above the sheet is applied to the sheet 132 to clamp the filter cloth between this sheet and the supporting surface to prevent movement of the filter cloth in its longitudinal direction.

Instead of a separate enclosure 136 for the clamp, it is also possible to place the clamp in the same enclosure that is used for the filtering machine as a whole, when this machine is one that uses positive pressure to carry out the filtering operation. In this version, the rectangular grid 54 can still be vented to atmosphere through a suitable pipe 66.

The gas pressure clamp 130 can also, if desired, be provided with means for introducing water to a side of the filter cloth facing the pressure sheet 132. This water or cleaning liquid is forced through the filter cloth during operation of the device in order to remove solids entrained in the cloth. The means for introducing the water or cleaning liquid can be constructed in the same manner as illustrated for the vacuum clamp of FIGS. 5 and 6. The water, again, is introduced through short pipe connectors 124 that project upwardly from the pressure sheet 132. In this embodiment, it is the pressure of the water entering the channels in the sheet 132 which forces the water through the filter cloth and into the support device 54. Because the positive air pressure acting downwardly on the sheet 132 holds the sheet firmly against the top of the filter cloth, the water in the channels has nowhere to go except through the filter cloth.

The advantages of the vacuum clamp and gas-pressure operated clamp of the invention will be readily apparent to those skilled in the use of horizontal vacuum filtering equipment. With such clamps, it is possible to restrain the filter cloth across its entire width, and thus distribute the forces that act on the cloth. These clamps can be used with both lightweight and heavy weight filter cloth. It is possible to operate the clamp using the vacuum pump or the air compressor that is already provided with the filtering machine for purposes of the filtering process. The clamping force can be applied whether the filter cloth is clean or dirty. In the case of a vacuum clamp constructed in accordance with the invention, any residual moisture which is in the filter cloth when it enters the clamp will be removed as part of the clamping process and this may eliminate the requirement for drip trays underneath the filter machine.

It will be obvious to one skilled in this art that various modifications and changes can be made to the vacuum clamp, filtering machine and gas-pressure operated clamp described herein without departing from the spirit and scope of this invention. Accordingly, all such modifications and changes as fall within the scope of the appended claims are intended to be part of this invention.

I therefore claim:

1. A vacuum clamp for preventing movement of an elongate, movable filter cloth comprising:

a support frame;

a supporting device having a perforated support surface for supporting said filter cloth, said supporting device being mounted on said support frame and being adapted for connection to a vacuum source, so that a vacuum can be applied to numerous holes in the support surface;

an imperforate sealing sheet extending over said support surface and in close proximity thereto, and a number of weights on said sealing sheet wherein said elongate filter cloth can be drawn between said supporting device and said sealing sheet and a vacuum can be applied to said filter cloth by said supporting device in order to prevent movement of said filter cloth in its longitudinal direction, said sealing sheet being pulled against said filter cloth by the vacuum and thereby preventing air from passing through the filter cloth in the area of said perforated support surface.

2. A vacuum clamp according to claim 1 wherein said support surface forms a planar rectangular grid comprising rows of closely spaced holes and said grid is surrounded by a sealing surface positioned below said sealing sheet.

3. A vacuum clamp according to claim 2 including said elongate filter cloth which is formed into a continuous loop, said cloth having a width corresponding approximately to the dimension of said rectangular grid which is perpendicular to the direction of movement of said filter cloth.

4. A vacuum clamp according to claim 2 wherein said supporting surface is formed substantially from a grid made of polypropylene.

5. A vacuum clamp according to claim 2 wherein said weights are positioned on said sealing sheet above said sealing surface and comprise a number of flat tile-like members arranged in rows adjacent the periphery of the sheet.

6. A vacuum clamp for preventing movement of an elongate, movable filter cloth comprising:

a support frame;

a supporting device having a perforated support surface for supporting said filter cloth, said supporting device being mounted on said support frame and being adapted for connection to a vacuum source so that a vacuum can be applied to numerous holes in the support surface;

an imperforate sealing sheet extending over said support surface and in close proximity thereto, and means for introducing water to a side of said filter cloth facing said sealing sheet, said water being drawn through said filter cloth during operation of the supporting device in order to remove solids entrained in said filter cloth.

7. A filtering machine comprising an endless belt of filter cloth arranged to have a horizontally extending, upper reach and a lower reach; at least one vacuum tray disposed beneath said upper reach; means for feeding material to be filtered onto said upper reach; means for intermittently advancing said upper reach of the belt by a predetermined distance in a selected direction; a vacuum clamp for preventing lengthwise movement of at least a section of said lower reach of the belt by clamping a portion of said lower reach, said clamp operating when said advancing means is used to advance said upper reach and including a perforated, planar support surface for holding said filter cloth during operation of said clamp, air passage means for applying vacuum to numerous holes in said support surface, and an impervious sealing sheet extending over said support surface and in close proximity thereto; means for connecting a vacuum source to said vacuum clamp; and means for supporting said vacuum clamp in a position adjacent said lower reach of the endless belt, wherein said belt extends between said support surface and said sealing sheet and a vacuum can be applied to said filter cloth by said clamp, thereby pulling said sealing sheet against said filter cloth.

8. A filtering machine according to claim 7 wherein said support surface forms a planar rectangular grid comprising rows of closely spaced holes and said grid is surrounded by a sealing surface positioned below said sealing sheet.

9. A filtering machine according to claim 8 including said vacuum source, means for connecting said vacuum source to said at least one vacuum tray, valve means for operatively connecting said vacuum source to said at least one vacuum tray, and further valve means for operatively connecting said vacuum source to said vacuum clamp.

10. A filtering machine according to claim 8 including a number of weights on said sealing sheet which is made of flexible fabric.

11. A filtering machine according to claim 8 wherein said filter cloth has a uniform width corresponding approximately to one dimension of said rectangular grid which is perpendicular to the direction of advancement of said filter cloth.

12. A filtering machine according to claim 7 including a cloth wash box for washing said filter cloth, said wash box being mounted along said lower reach of said belt and said vacuum clamp being mounted in the vicinity of said wash box, wherein in use of said machine, said filter cloth moves from said wash box to said vacuum clamp.

13. A filtering machine according to claim 7 including said vacuum source which is connected to both the vacuum clamp and said at least one vacuum tray.

14. A gas pressure operated clamp for preventing movement of an elongate, movable filter cloth comprising:

a supporting device for supporting an area of said filter cloth, said device having a supporting surface arranged to extend along one side of said filter cloth, an imperforate pressure sheet extending over said supporting surface and in proximity thereto;

a number of weights mounted on top of said pressure sheet; and means for applying gas pressure to one side of said sheet so as to press said sheet towards said supporting surface over said area of the filter cloth, wherein during use of said clamp, said elongate filter cloth is drawn between the other side of said pressure sheet and said supporting device and gas pressure is applied to said sheet to clamp the filter cloth between said pressure sheet and the supporting surface to prevent movement of said filter cloth in its longitudinal direction.

15. A gas pressure clamp according to claim 14 wherein said supporting device comprises a planar rectangular grid having rows of closely spaced holes surrounded by a sealing surface positioned below said pressure sheet.

16. A gas pressure operated clamp according to claim 15 wherein said applying means includes an enclosure extending around said supporting device and said pressure sheet and a pressurized air space is provided above said pressure sheet.

17. A gas pressure operated clamp according to claim 16 wherein said applying means includes means for maintaining an air pressure exceeding atmospheric pressure in said enclosure and the holes in said rectangular grid are vented to atmosphere.

18. A gas pressure operated clamp for preventing movement of an elongate, movable filter cloth comprising:
  a supporting device for supporting an area of said filter cloth, said device having a supporting surface arranged to extend along one side of said filter cloth,
  an imperforate pressure sheet extending over said supporting surface and in proximity thereto;
  means for applying gas pressure to one side of said sheet so as to press said sheet towards said supporting surface over said area of the filter cloth, and
  means for introducing a cleaning liquid to a side of said filter cloth-facing said pressure sheet, said cleaning liquid being forced under pressure through said filter cloth during operation of the clamp in order to remove solids entrained in said filter cloth.

19. A cleaning device for an elongate, movable filter cloth comprising a support frame, a supporting device having a support surface with numerous perforations formed therein, said supporting device being mounted on said support frame and being adapted for connection of said perforations to a vacuum source or atmosphere, an imperforate sealing cover extending over said support surface and in close proximity thereto, means for introducing and distributing a cleaning liquid between said cover and said filter cloth when the latter is drawn between said cover and said supporting device, and means for forcing said cleaning liquid through the filter cloth and into said supporting device, wherein at least a peripheral region of said cover is caused by said forcing means to be pressed against an adjacent surface of the filter cloth, thereby sealing the peripheral region of the cover against the filter cloth.

20. A cleaning device according to claim 19 wherein said forcing means includes an air pressurizing enclosure extending around said supporting device and said sealing cover, said enclosure permitting a positive air pressure above atmospheric pressure to be provided on a side of said sealing cover facing away from the filter cloth.

21. A cleaning device according to claim 19 wherein said introducing and distributing means comprises a number of side-by-side distribution channels extending across a substantial portion of the width of the sealing cover in the transverse direction of the filter cloth and pipe connectors extending through and attached to the sealing cover, said pipe connectors opening into said channels.

22. A cleaning device according to claim 19 wherein said supporting device comprises a planar rectangular grid having rows of closely spaced holes surrounded by a sealing surface positioned below said sealing cover.

23. A cleaning device according to claim 22 wherein said forcing means includes a number of weights arranged in rows about the perimeter of said sealing cover.

24. A cleaning device according to claim 19 wherein said forcing means is a vacuum pump and pipe means for connecting said supporting device to said vacuum pump.

25. A method for filtering a material using a horizontal vacuum filter, said method comprising:
  providing a filtering machine having an endless belt of filter cloth with a horizontal upper reach and a lower reach and at least one vacuum tray disposed beneath said upper reach;
  feeding material to be filtered onto said upper reach and applying a vacuum to said material by means of said at least one vacuum tray in order to filter same;
  intermittently advancing said upper reach of the belt in a forward lengthwise direction by a predetermined distance; and
  preventing said lower reach of the belt from moving in said forward lengthwise direction during the advancing step by clamping a portion of said lower reach with a clamping mechanism after filtered material has been discharged from said portion of the filter cloth, said clamping mechanism comprising a supporting device for supporting said filter cloth and an imperforate sealing sheet extending over said supporting device and in close proximity thereto, said belt extending between said supporting device and said sealing sheet, said clamping step being carried out by applying a vacuum to said filter cloth by said supporting device, said sealing sheet being pulled against said filter cloth by the vacuum.

26. A method according to claim 25 including pressing said sealing sheet against said belt by providing a number of weights distributed over and attached to said sealing sheet.

27. A method according to claim 25 wherein said supporting device forms a planar rectangular grid comprising rows of closely spaced holes, said grid being surrounded by a sealing surface positioned below said sealing sheet.

28. A method according to claims 25 including introducing water to a side of said filter cloth facing said sealing sheet, said water being drawn through said filter cloth during operation of the supporting device in order to remove left-over solids entrained in said filter cloth.

29. A method according to claim 25 including washing said filter cloth with a wash box mounted along said lower reach of said belt, said clamping mechanism being mounted in the vicinity of said wash box, said belt being moved during use from said wash box to said clamping mechanism.

30. A method for filtering a material using a horizontal vacuum filter, said method comprising:
  providing a filtering machine having an endless belt of filter cloth with a horizontal upper reach and a lower reach and at least one vacuum tray disposed beneath said upper reach;
  feeding material to be filtered onto said upper reach and applying a vacuum to said material by means of said at least one vacuum tray in order to filter same;
  intermittently advancing said upper reach of the belt in a forward lengthwise direction by a predetermined distance;

preventing said lower reach of the belt from moving in said forward lengthwise direction during the advancing step; and discharging the filtered material from said filter cloth at one end of said upper reach, wherein said lower reach is prevented from moving by clamping a portion of said lower reach with a clamping mechanism after the filtered material has been discharged from said portion of the filter cloth, said clamping mechanism comprising a supporting device for supporting said filter cloth and an imperforate pressure sheet extending over said supporting device and in close proximity thereto, said belt extending between said supporting device and said pressure sheet, said clamping step being carried out by applying gas pressure to one side of said pressure sheet so as to press said sheet towards said supporting device and against an area of said filter cloth.

31. A method for filtering a material according to claim 30 wherein said supporting device has a perforated supporting surface arranged along one side of said filter cloth and said pressure sheet is pressed towards said supporting surface.

32. A method of filtering a material according to claim 30 including providing an enclosure extending around said supporting device and said pressure sheet, and applying said gas pressure by pressurizing an air space located in said enclosure and above said pressure sheet.

* * * * *